United States Patent [19]

Entrikin

[11] Patent Number: 4,634,134

[45] Date of Patent: Jan. 6, 1987

[54] MECHANICAL SEAL

[75] Inventor: Raymond A. Entrikin, East Liverpool, Ohio

[73] Assignee: Epworth Manufacturing Co., Inc., South Haven, Mich.

[21] Appl. No.: 732,201

[22] Filed: May 8, 1985

[51] Int. Cl.[4] ........................ B02C 17/00; F16J 15/16; F16J 15/54

[52] U.S. Cl. .................................. 277/12; 241/46.11; 241/46.17; 241/171; 241/172; 277/81 R; 277/82; 277/236; 277/DIG. 8

[58] Field of Search ...................... 277/15, 81 R, 81 P, 277/85, 96.1, 38, 40, 82, DIG. 8, 86, 92, 70, 212 R, 212 F, 212 C, 96, 205, 188 R, 236, 96.2, 12; 241/172, 171, 46.11, 46.17

[56] References Cited

U.S. PATENT DOCUMENTS

| | | | |
|---|---|---|---|
| 2,167,669 | 8/1939 | Molynenx | 277/92 X |
| 2,480,085 | 8/1949 | Mitchell | 241/171 X |
| 2,532,422 | 12/1950 | Richardson | 277/212 F X |
| 2,933,260 | 4/1960 | Tessmer | 241/171 |
| 3,031,199 | 4/1962 | Laser et al. | 277/92 X |
| 3,108,514 | 10/1963 | Gordon | 277/212 C X |
| 3,202,364 | 8/1965 | Wieland | 241/172 X |
| 3,533,635 | 10/1970 | Godin et al. | 277/15 X |
| 3,783,737 | 1/1974 | Ashley | 277/212 C X |
| 4,174,074 | 11/1979 | Geiger | 241/46.11 |
| 4,273,295 | 6/1981 | Pollmann | 241/172 X |
| 4,294,454 | 10/1981 | Cannings | 277/DIG. 8 |
| 4,335,887 | 6/1982 | Benassi | 277/92 X |
| 4,582,266 | 4/1986 | Entrikin et al. | 241/172 |

FOREIGN PATENT DOCUMENTS

| | | | |
|---|---|---|---|
| 432156 | 9/1967 | Switzerland | 277/86 |
| 625998 | 7/1949 | United Kingdom | 277/DIG. 8 |
| 2065798 | 7/1981 | United Kingdom | 277/DIG. 8 |

Primary Examiner—Allan N. Shoap
Attorney, Agent, or Firm—Flynn, Thiel, Boutell & Tanis

[57] ABSTRACT

A mechanical seal apparatus for use between a wall and a shaft extending through an opening in said wall with relative rotation occurring therebetween. The shaft extends from a first region at a first pressure into the opening in the wall and a second region at a second pressure. A seal element is positioned within the opening and has mutually contacting sealing faces. One annular seal member is fixed with respect to the wall and another annular seal member is fixed with respect to the shaft. The annular seal member is oriented at an exterior portion of the wall and has an outer diameter less than the diameter of the opening in the wall to define a gap therebetween. A bushing member is snugly received in the gap for preventing entry and collection of material into the gap. The bushing member has an axially facing surface facing away from said opening as well as radially outwardly of said shaft for repelling the material from entry into the gap.

14 Claims, 4 Drawing Figures

MECHANICAL SEAL

FIELD OF THE INVENTION

This invention relates to a mechanical seal and, more particularly, to a mechanical seal having a seal element with mutually contacting sealing faces, one annular seal member being fixed with respect to a wall and the other annular seal member being fixed with respect to a shaft, the outer diameter of the one annular seal member being less than the diameter of an opening in a wall therefor to define a gap therebetween, and a bushing snugly received in the gap for preventing the entry and collection of material in the gap.

BACKGROUND OF THE INVENTION

This invention arose out of a further development associated with the centrifugal media mill disclosed in U.S. Pat. No. 4,244,531. The centrifugal media mill includes a vessel having a wall thereon with an opening therein through which a shaft extends. In this particular embodiment, the vessel rotates with respect to a stationary shaft. Further, the vessel is provided with an inlet port and an outlet port facilitating the flow of a liquid substance through the vessel. The vessel is filled with a particulate grinding media and, as the vessel rotates, the media acts upon the liquid substance to process same in a desirable manner. The grinding media has the ability to work its way toward the seal between the shaft and the wall of the vessel and can attack and damage the seal thereat. Further, liquid substance becomes entrapped within this region. Thus, when the processing operation is completed, and it becomes necessary to flush the remaining liquid substance from the vessel by passing a solvent through the vessel, the solvent, in many instances, will not reach the gap between the shaft and the vessel wall and the remaining and entrapped liquid substance will not be removed by the solvent. Thus, a new liquid substance entering the vessel will be contaminated by the previous substance that had passed through the mill.

Thus, a need has arisen to prevent the grinding media from attacking the seal components as well as preventing the liquid substance being processed within the mill from entering a gap between a shaft and a wall of the vessel.

It is to be recognized that while this invention arose out of a need in a particular environment, it is to be understood that the specific environs of the invention is not to limit the scope of the invention in any respect.

Accordingly, it is an object of this invention to provide a mechanical seal having a pair of seal members, one being fixed with respect to a wall and the other being fixed with respect to a shaft, which seal members are in mutually contacting relation to each other, the seal member fixed with respect to the wall being less in diameter than the opening provided in the wall therefor so that a gap is defined therebetween and filling the gap with a bushing preventing the entry and collection of material within the gap.

It is a further object of the invention to provide a mechanical seal, as aforesaid, for use in an environment wherein the bushing is adapted to protect the seal members from the damaging effects of the material attempting to enter the aforesaid gap.

It is a further object of the invention to provide a mechanical seal, as aforesaid, wherein the aforesaid bushing has a surface directly exposed to the material, which surface has a specific surface contour to assist in the repelling of the material attempting to enter the aforesaid gap.

SUMMARY OF THE INVENTION

In general, the objects and purposes of the invention are met by providing a mechanical seal apparatus for use between a wall and a shaft extending through an opening in the wall with relative rotation occurring therebetween. The shaft extends from a first region at a first pressure into the opening in the wall and a second region at a second pressure. A seal element is comprised of a pair of annular seal members, one being fixed with respect to the wall and the other being fixed with respect to the shaft. The two seal members are in mutually contacting relation with each other with one of the seal members being oriented at the exterior portion of the wall and having an outer diameter less than the diameter of the opening to define a gap therebetween. A bushing is snugly received in the gap for blocking the entry into and collection of material into the gap. The bushing has a surface for repelling and preventing movement of the aforesaid material into the gap.

BRIEF DESCRIPTION OF THE DRAWINGS

Further objects and purposes of this invention will be apparent to persons acquainted with apparatus of this general type upon reading the following specification and inspecting the accompanying drawings, in which.

DETAILED DESCRIPTION

Figure 4:
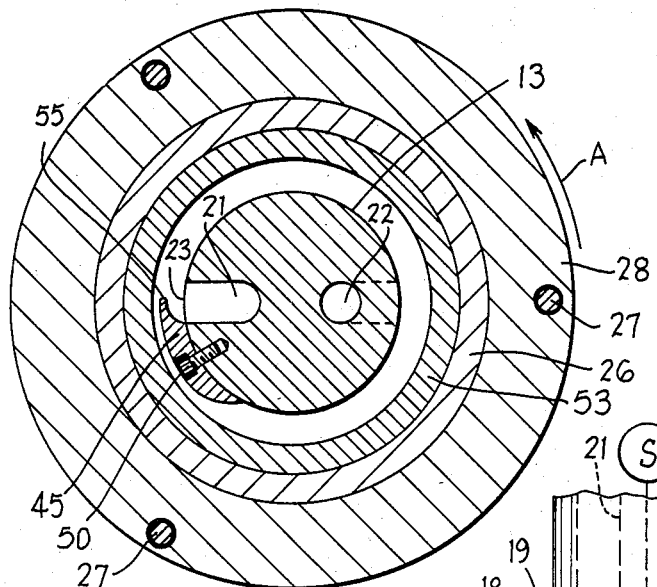
FIG. 4 is a sectional view taken along the line IV—IV of FIG. 1.

As stated above, this invention arose out of a need to satisfy a problem associated with a device for effecting a reduction in the size of a particulate in a particulate-containing substance. Reference is to be made to U.S. Pat. No. 4,244,531. Reference to this patent is to be incorporated herein.

The invention disclosed in the present application is directed to the construction of the mechanical seal 10, the details of which will be explained in more detail below. However, and before explaining the details of the mechanical seal 10, the environment in which the mechanical seal is presently being used will be explained for convenience.

A media comminuting mill 11 includes a comminuting vessel 12. Although the comminuting vessel 12 is substantially a right circular cylinder, vessels having other geometries, such as an inverted cone, can also be used for certain applications. The vessel 12 includes a centrally disposed and nonrotatable shaft 13 therein which, in this particular embodiment, extends through an opening 16 in a plate 14 and is secured thereto by means of a conical wedge structure 17 locking a key 18 into a slot 19 in the shaft 13. A pair of separate passageways 21 and 22 extend through the interior portion of the shaft 13 and exit at the surface of the shaft at two axially spaced locations 23 and 24, respectively. The purpose of the passageways 21 and 22 will be explained in more detail below.

The vessel 12 has secured at the upper end thereof a pair of mounting rings 25 and 26 by a plurality of screws 27A and 27B. The mounting rings 25 and 26 each encircle the shaft 13. An axially elongated annular wall member 28 is mounted on the mounting ring 26 and is secured thereto by the same screws 27B that fixedly secure the mounting ring 26 to the upper end of the mounting ring 25. The diameter of the internal surface 30 of the annular wall 28 is greater than the external diameter of the shaft 13 so that a space is defined therebetween. A bearing mechanism 29 is oriented between the internal surface of the annular wall 28 and the external surface of the shaft 13 to facilitate a relative rotation between the vessel 12, connected mounting rings 25 and 26 and annular wall 28 and the shaft 13. The bearing mechanism 29 is oriented at the end of the annular wall 28 that is remote from the vessel 12. An end cap 31 is secured to the end of the annular wall 28 by a plurality of screws 32. If desired, a pair of lip seals 33 and 34 can be placed at opposite ends of the bearing mechanism 29 and between the internal surface 30 of the wall 28 and the external surface of the shaft 13 to permit a lubricating of the bearing mechanism 29 and a prevention of an escape of the lubricant from the bearing structure 29.

Figure 1:
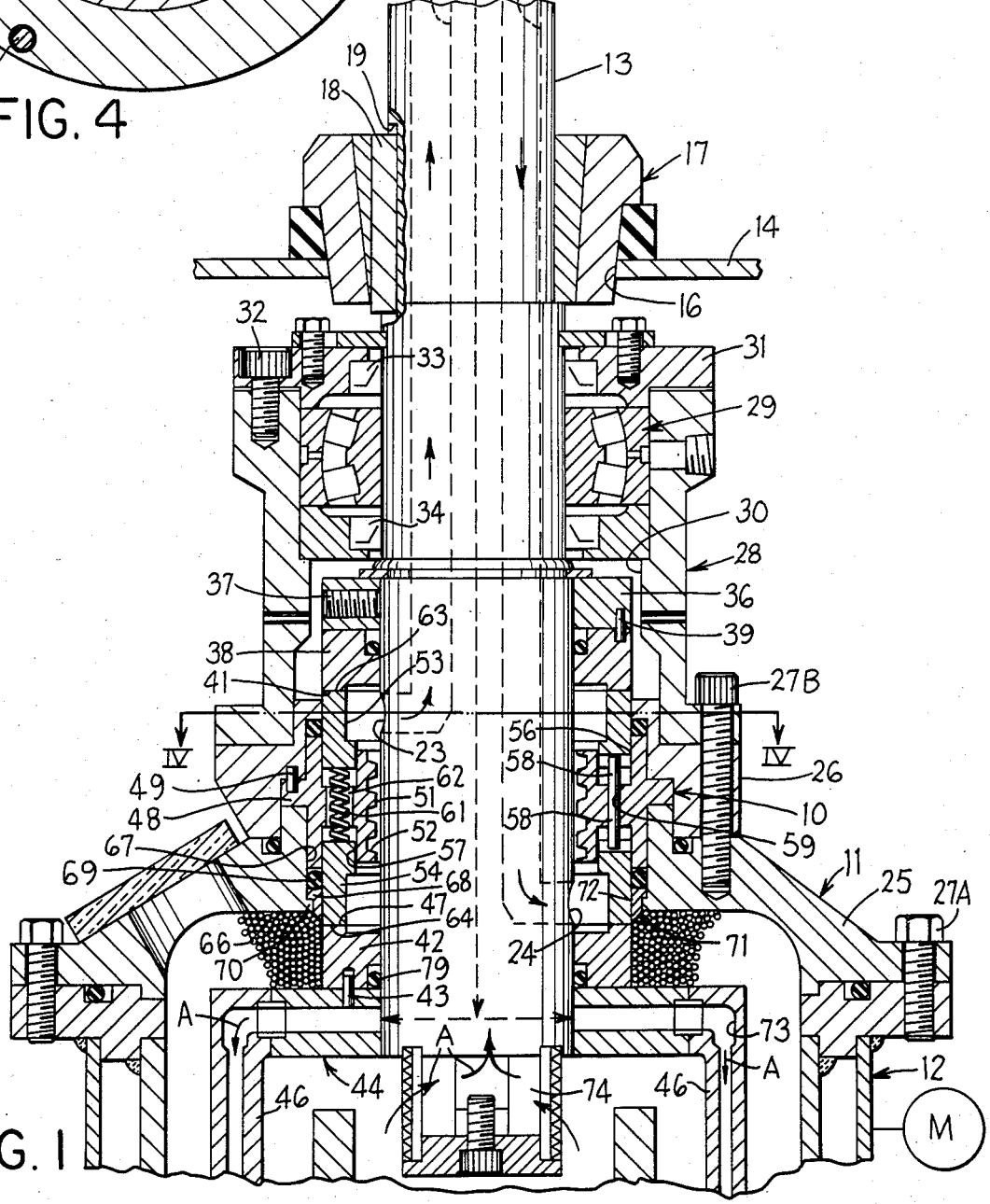
FIG. 1 is a central cross-sectional view of a mechanical seal apparatus embodying the invention.

The vessel 12 is also supported for rotation at the end thereof that is not illustrated in FIG. 1. The rotatable support is, however, shown in the aforementioned U.S. Pat. No. 4,244,531, reference to which is incorporated herein. A motor M (schematically illustrated in FIG. 1) is utilized for driving the vessel for rotation and with respect to the fixed shaft 13.

The mechanical seal 10 serves the purpose of preventing the contents within the vessel from moving into the aforesaid spacing between the internal surface 30 of the annular wall 28 and connected mounting ring 26 and the external surface of the shaft 13. The mechanical seal includes a backing collar 36 which encircles the shaft 13 and is secured thereto by a set screw 37. A seat collar 38 encircles the shaft 13 and abuts against the backing collar 36 and is fixed thereto by at least one axially extending pin 39. The seat collar 38 is preferably made of a bronze, carbon, ceramic or a tungsten carbide material and has an axially facing seal face 41 on the side thereof remote from the backing collar 36. Similarly, another seat collar 42, preferably made of a tungsten carbide, is axially spaced from the seat collar 38, and encircles the shaft 13 and is fixedly secured thereto by at least one axially extending pin 43. In this particular embodiment, structure is affixed to the shaft 13, namely, a circular cross member 44 having plural deflector members 46 secured thereto. The axially extending pin 43 is secured to the circular cross member 44 and it is through this connection that the seat collar 42 becomes affixed to the shaft 13. The purpose of the circular cross member 44 and the associated deflector members 46 are not part of this invention but are adequately described in the aforesaid U.S. Pat. No. 4,244,531 and reference thereto is to be made for a more complete discussion thereof. In this particular embodiment, the seat collar 42 is made of a tungsten carbide material and has an annular seal face 47 thereon on a side thereof that is remote from the circular cross member 44. The seal face 41 and the seal face 47 are opposed to one another.

An annular guide collar 48 encircles the shaft 13 between the aforesaid seal faces 41 and 47 and is fixedly secured to the mounting ring 26 by at least one axially extending pin 49. The internal surface 51 of the guide collar 48 has an internal thread 52 thereon. If desired, the thread 52 can be removed and an auxiliary pump (not shown) used in place thereof by connecting same in fluid circuit with the passageway 22.

The ports 23 and 24 for the passageways 21 and 22, respectively, are oriented at opposite ends of the thread 52 and into the regions between an end of the thread 52 and the seal face 41 as well as the other end of the thread 52 and the seal face 47. Thus, as the vessel 12 rotates, the guide collar 48 will rotate therewith and the threads 52 will effect a pumping of a barrier fluid between the ports 23 and 24. The barrier fluid being transmitted between the ports 23 and 24 is a coolant for cooling the mechanical seal 10 as well as a lubricant for the seal faces.

In this particular embodiment, the barrier fluid flows from the port 24 to the port 23. A scoop 45 (FIG. 4) is secured to the shaft 13 by at least one screw 50. The counterclockwise rotation of the vessel 12 (see the arrow A in FIG. 4) will cause the barrier fluid to also move in a counterclockwise direction. The scoop 45 has a circumferentially extending flange 55 adapted to direct the barrier fluid into the port 23. If the auxiliary pump is utilized, it has been discovered that the scoop 45 can be eliminated.

A pair of annular seal rings 53 and 54 encircle the shaft 13. Further, the seal ring 53 is guided in an annular recess 56 in one end of the guide collar 48. The seal ring 54 is also guided in an annular recess 57 in the other end of the guide collar 48. At least one axially extending guide pin 58 is secured to each of the seal ring 53 and the seal ring 54. Each guide pin 58 is received into an opening 59 in the guide collar 48 for preventing relative rotation from occurring between the two seal rings 53 and 54 and the guide collar 48. Further, a spring 61 is provided in an opening 62 in the guide collar 48. One end of the spring 61 bears against an axially facing side of the seal ring 53 remote from the seat collar 38 and the other end thereof engages the seal ring 54 on a side thereof remote from the seat collar 42. The spring 61 urges an annular seal face 63 on the seal ring 53 into a sealing engagement with the seal face 41. Similarly, an annular seal face 64 on the seal ring 54 is urged by the spring 61 into a sealing engagement with the seal face 47.

Since it is usually the case that a high pressure exists at one end of the mechanical seal 10, it is necessary to prevent the region of the high pressure from effecting a movement of material or the like into the inner workings of the mechanical seal 10. To prevent this, prior art structures have used O-rings and packing material. However, in an environment, such as a media mill, particular grinding media 66 is present in the mill and it has a tendency to attack and destroy O-rings and packing material when it comes into engagement therewith. Normal machining operatings will generate a space between, for example, the radially external surface of the seal ring 54 and the internal surface 67 of an opening at one end of the vessel 12. O-rings and packing material have heretofore been placed into this spacing. The present invention relates to the placement of a bushing 68 into the aforesaid spacing, which bushing is made of a material hard enough to resist the aggressive action of the particular grinding media 66. The bushing 68 has an annular enlargement thereon adapted to rest on a radially inwardly extending lip 70 on the mounting ring 25. Further, the bushing is preferably made of a hardened stainless steel. An O-ring 69 also encircles the exterior surface of the seal ring 54 and bears against one end of the bushing 68, namely, that end remote from the lip 70 and the end of the bushing 68 exposed to the particulate grinding media 66.

Figure 2:
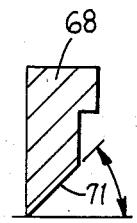
FIG. 2 is an enlarged fragment of a first embodiment of the bushing.
Figure 3:
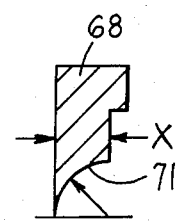
FIG. 3 is an enlarged fragment of a second embodiment of the bushing.

Referring to FIG. 2, the exposed surface 71 on the bushing member 68 is conical and is inclined to the horizontal at an angle in the range of 40° to 50°. It has been discovered that the provision of this angle will be sufficient to optimize the resistance to material removal by the grinding media 66. FIG. 3 illustrates a modified form of the bushing member 68 wherein the exposed surface 71 is arcuate in shape, the radius of which is equal to the radial thickness X of the bushing member 68 immediately adjacent the exposed surface 71. The arcuate surface has also been found to be effective in optimizing the ability of the bushing 68 to resist material removal by the particulate grinding media 66. The radially inner surface 72 of the bushing 68 and the external surface of the seal ring 54 are machined to a close tolerance so that a snug sliding fit is provided therebetween. Thus, as pressure begins to build within the rotating vessel 12, this pressure will urge the bushing 68 rotating with the vessel axially upwardly in FIG. 1 against the O-ring 69 tending to compress same and effect a tight seal thereat. Thus, the bushing 68 will effectively prevent grinding media 66 from attacking the O-ring 69 and simultaneously prevent, for example, a liquid substance from a source 5 passing through the vessel 12 in direction of the flow arrows via an inlet passage way 73 and an outlet passageway 74 from entering and collecting within the space occupied by the O-ring 79. Thus, following a processing of a given liquid material passing through the vessel 12, a solvent can be introduced into the vessel to effectively rinse the vessel without leaving any residue of the previous liquid substance processed in the media mill 11.

Since the seal created between the seat collar 38 and the seal ring 53 is relative to the atmosphere, no bushing is required between the internal surface of the wall 28 and the exterior surface of the seal ring 53.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A mechanical seal apparatus for use between a wall and a shaft extending through an opening in said wall with relative rotation occurring therebetween, said shaft extending from a first region at a first pressure into said opening in said wall to a second region at a second pressure, comprising:
   a seal element positioned within said opening and having mutually contacting sealing faces, a first annular seal member being fixed with respect to said wall and a second annular seal member being fixed with respect to said shaft, said second annular seal member being oriented at an axial end portion of said wall and having an outer diameter less than the diameter of said opening in said wall to define a gap therebetween; and
   bushing means snugly received in said gap for preventing entry and collection of material into said gap, said bushing means comprising an annular, axially extending leg portion having an axially facing end surface facing away from said opening and extending radially outwardly of said shaft for repelling said material from entry into said gap.

2. The mechanical seal apparatus according to claim 1, wherein said wall has a hollow vessel connected thereto; and
   wherein said first region is inside said vessel and whereat said first pressure is extant; and
   wherein said vessel houses a particulate material, said bushing means and axially facing surface preventing said particulate material from entering said gap.

3. The mechanical seal apparatus according to claim 2, wherein said vessel includes means supporting said vessel for rotation relative to a stationary said shaft, said vessel means further including inlet and outlet means enabling the flow of a liquid substance through said particulate material, said bushing means rotating with said vessel means and preventing entry and collection of said liquid substance into said gap to thereby facilitate a thorough rinsing of said vessel of said liquid substance without leaving a portion of said liquid substance entrapped in said gap.

4. The mechanical seal apparatus according to claim 1, wherein said axially and radially facing surface is conical and the internal angle of said conical surface is in the range of 80° to 100°.

5. The mechanical seal apparatus according to claim 1, wherein said axially and radially facing annular surface is arcuate in cross section, the radius of which is approximately equal to the radial dimension of said bushing means.

6. The mechanical seal apparatus according to claim 1, wherein said bushing means is a metallic member.

7. The mechanical seal apparatus according to claim 6, wherein said metallic member is made of a hardened stainless steel.

8. A mechanical seal apparatus for use between a wall and a shaft extending through an opening in said wall with relative rotation occurring therebetween, said shaft extending from a first region at a first pressure into said opening in said wall to a second region at a second pressure, comprising:
   an elongated shaft;
   a closed vessel means and support means facilitating a relative rotation between said vessel means and said shaft, said vessel means having said wall thereon;
   a particulate grinding media in said vessel means;
   inlet and outlet means on said vessel means enabling the flow of a liquid substance through said vessel means and said particulate grinding media, said liquid substance being processed in response to a relative rotation occurring between said shaft and said vessel means;
   means for supplying under pressure a liquid substance through said inlet means to the interior of said vessel means and thence to said outlet means;
   a seal element positioned within said opening and having mutually contacting sealing faces, a first annular seal member being fixed with respect to said wall and a second annular seal member being fixed with respect to said shaft, said second annular seal member being oriented at the an axial end portion of said wall and having an outer diameter less than the diameter of said opening to define a gap therebetween; and
   bushing means snugly received in said gap and having a surface means directly exposed to said particulate grinding media and said liquid substance, said bushing means preventing entry and collection of said grinding media into said gap as well as said liquid substance to thereby facilitate a thorough rinsing of said vessel of said liquid substance from said vessel without leaving a residue of liquid substance entrapped in said gap, said bushing means comprising an annular, axially extending leg portion having an axially facing end facing away from said opening and extending radially outwardly of said shaft for repelling said material from entry into said gap.

9. The mechanical seal apparatus according to claim 8, wherein said surface means is conical and the internal angle of said conical surface is in the range of 80° to 100°.

10. The mechanical seal apparatus according to claim 8, wherein said surface means is arcuate in cross section, the radius of which is approximately equal to the radius dimension of said bushing means.

11. The mechanical seal apparatus according to claim 8, wherein said bushing means is an annular ring having an L-shaped cross section, and further includes an O-ring seal intermediate said annular ring and said first annular seal member, said annular ring thereby protecting said O-ring from damage by said grinding media.

12. The mechanical seal apparatus according to claim 8, wherein said bushing means is a metallic member.

13. The mechanical seal apparatus according to claim 12, wherein said metallic member is made of a hardened stainless steel.

14. The mechanical seal apparatus according to claim 8, wherein said shaft is stationary and wherein said support means supports said vessel means for rotation with respect to said shaft, said bushing means rotating with said vessel means.

* * * * *